(12) United States Patent
Nagai et al.

(10) Patent No.: US 9,944,133 B2
(45) Date of Patent: *Apr. 17, 2018

(54) PNEUMATIC TIRE AND METHOD OF MANUFACTURING THE SAME

(71) Applicant: Toyo Tire & Rubber Co., Ltd., Osaka-shi, Osaka (JP)

(72) Inventors: Kunihiko Nagai, Osaka (JP); Akina Kouuchi, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 279 days.

This patent is subject to a terminal disclaimer.

(21) Appl. No.: 14/650,671

(22) PCT Filed: Oct. 10, 2013

(86) PCT No.: PCT/JP2013/006058
§ 371 (c)(1),
(2) Date: Jun. 9, 2015

(87) PCT Pub. No.: WO2014/103110
PCT Pub. Date: Jul. 3, 2014

(65) Prior Publication Data
US 2016/0052347 A1    Feb. 25, 2016

(30) Foreign Application Priority Data

Dec. 26, 2012 (JP) ................................. 2012-283580
Dec. 27, 2012 (JP) ................................. 2012-285507
Dec. 27, 2012 (JP) ................................. 2012-285509

(51) Int. Cl.
*B60C 15/00* (2006.01)
*B29D 30/30* (2006.01)
(Continued)

(52) U.S. Cl.
CPC ........ *B60C 15/0072* (2013.01); *B29D 30/248* (2013.01); *B29D 30/30* (2013.01);
(Continued)

(58) Field of Classification Search
CPC .................................................. B60C 15/0072
See application file for complete search history.

(56) References Cited

U.S. PATENT DOCUMENTS

| 5,513,686 A | 5/1996 | Diernaz |
| 6,913,052 B2* | 7/2005 | Losey .................... B29D 30/20 152/551 |
| 2004/0123937 A1* | 7/2004 | Losey .................... B29D 30/20 156/132 |

FOREIGN PATENT DOCUMENTS

| CH | 407782 A | 2/1966 |
| DE | 3515944 A1 | 11/1986 |

(Continued)

OTHER PUBLICATIONS

International Search Report dated Dec. 17, 2013, issued in corresponding application No. PCT/JP2013/006058, (1 page).
(Continued)

*Primary Examiner* — Joseph S Del Sole
*Assistant Examiner* — Cedrick S Williams
(74) *Attorney, Agent, or Firm* — Westerman, Hattori, Daniels & Adrian, LLP

(57) ABSTRACT

Provided is a pneumatic tire having the structure where a carcass ply is wound around bead cores from the outside in the tire width direction to the inside in the tire width direction, and both end portions of an inner liner extend between beads and the carcass ply. A lightweight and highly rigid tire can be acquired. The tire can also enhance steering stability performance thereof. The pneumatic tire includes: a pair of left and right beads including bead cores 3*a*; a carcass ply extending between the bead cores; and an inner liner 4 disposed on an inner peripheral side of the carcass ply 5, wherein the carcass ply 5 is wound around the bead cores 3*a* from the outside in the tire width direction to the inside in the tire width direction, and both end portions of the inner liner 4 extend between the beads and the carcass ply.

15 Claims, 12 Drawing Sheets

(51) Int. Cl.
- *B60C 15/06* (2006.01)
- *B60C 5/14* (2006.01)
- *B29D 30/24* (2006.01)
- *B29D 30/32* (2006.01)
- *B29D 30/58* (2006.01)

(52) U.S. Cl.
CPC ............. *B29D 30/32* (2013.01); *B29D 30/58* (2013.01); *B60C 5/14* (2013.01); *B60C 15/06* (2013.01); *B29D 2030/3278* (2013.01); *B60C 2015/009* (2013.01); *B60C 2015/0614* (2013.01)

(56) References Cited

FOREIGN PATENT DOCUMENTS

| | | |
|---|---|---|
| GB | 968257 A | 9/1964 |
| JP | 07-315013 A | 12/1995 |
| JP | 10-264607 A | 10/1998 |
| JP | 11-348515 A | 12/1999 |
| JP | 2002-052909 A | 2/2002 |
| JP | 2002-513360 A | 5/2002 |
| JP | 2004-359196 A | 12/2004 |
| JP | 2005-289301 A | 10/2005 |
| JP | 2006-193061 A | 7/2006 |
| JP | 2007-131173 A | 5/2007 |
| JP | 2008-062662 A | 3/2008 |
| JP | 2011-530449 A | 12/2011 |
| WO | 98/52777 A1 | 11/1998 |

OTHER PUBLICATIONS

Office Action dated May 9, 2017, issued in Japanese Patent Application No. 2013-247859, with English translation (correponds to U.S. Appl. No. 14/520,720).

Final Office Action dated Feb. 16, 2017, issued in U.S. Appl. No. 14/520,720.

Non-Final Office Action dated Nov. 7, 2016, issued in U.S. Appl. No. 14/520,720.

Notice of Allowance dated Apr. 27, 2017, issued in U.S. Appl. No. 14/520,720.

* cited by examiner

PNEUMATIC TIRE AND METHOD OF MANUFACTURING THE SAME

TECHNICAL FIELD

The present invention relates to a pneumatic tire, and more particularly to a pneumatic tire having the structure where a carcass ply is wound from the outside to the inside in the tire width direction, and a method of manufacturing the pneumatic tire.

BACKGROUND ART

Conventionally, as disclosed in the following Patent Literatures 1 to 3, there has been known a pneumatic tire where a carcass ply is wound from the outside to the inside in the tire width direction so that the distribution of tension applied to the carcass ply is changed whereby tension in a portion of the carcass ply at a position where the carcass ply easily contributes to the tire rigidity is increased thus enhancing steering stability performance.

The following patent literature 1 discloses the pneumatic tire which aims at the enhancement of steering stability of a tire. In the pneumatic tire, a carcass layer has the single layer structure, the carcass layer is wound around bead cores from the outside to the inside in the tire width direction, end portions of the carcass layer are arranged inside the bead cores in the tire radial direction, and the end portions of the carcass layer are wound around the bead cores from folding positions to the outside in the tire radial direction to an extent that the end portions of the carcass layer do not wrap the bead cores.

The following patent literature 2 discloses a tire which aims at the substantial reduction in frequency of the occurrence of tire breaking at an early stage by winding a carcass ply around bead cores from the outside to the inside in the tire width direction.

The following patent literature 3 discloses a pneumatic radial tire having the structure where a carcass ply passes along a more tire outer surface side than bead fillers, and both end portions of the carcass ply are wound around and supported on bead cores on both sides from the outside to the inside. This structure can contribute to the reduction in weight of the tire and can maintain rigidity of the tire without lowering performances such as steering stability of the tire.

Conventionally, there has been also proposed a pneumatic tire where a carcass ply is wound around beads from the inside in the tire width direction to the outside in the tire width direction, and an inner liner and rubber chafers are mounted on an outer side of the carcass ply. When the rubber chafers are disposed on the inner liner in an overlapping manner, the rubber chafers are adhered to the inner liner. In this case, at least an outer surface side of the inner liner is made of low permeability rubber so as to prevent the permeation of air into the tire. However, the low permeability rubber has a small modulus value and the rubber chafer has a high modulus value and hence, there exists a drawback that it is difficult to make the low permeability rubber of the inner liner and the rubber chafer adhere to each other because of large difference in a modulus value.

In the following Patent Literature 4 which is conventionally known, the pneumatic tire is disclosed where air bubbles generated in the inner liner and the carcass ply are suppressed by partially forming slits in the inner liner thus preventing lowering of inner pressure. Patent Literature 5 discloses a pneumatic tire where run-flat performance is enhanced by disposing reinforcing rubbers different from side wall rubbers outside and inside an inner liner layer.

Conventionally, there has been also proposed a pneumatic tire where a carcass ply is wound around bead cores from the inside in the tire width direction to the outside in the tire width direction, and an inner liner and rubber chafers are mounted on an outer side of the carcass ply. When the rubber chafers are disposed on the inner liner in an overlapping manner, the rubber chafers are adhered to the inner liner. In this case, at least an outer surface side of the inner liner is made of low permeability rubber so as to prevent the permeation of air into the tire. However, the low permeability rubber has a small modulus value and the rubber chafer has a high modulus value and hence, there exists a drawback that it is difficult to make the low permeability rubber of the inner liner and the rubber chafer adhere to each other because of large difference in a modulus value.

The following Patent Literature 6 which is conventionally known discloses a pneumatic tire which aims at the decreasing a heat generation amount of the whole tire by maintaining a function of preventing rubbing of rubber chafers against a rim and by suppressing the generation of heat in the rubber chafers at a low level and at the increasing the durability during traveling in a run-flat state when an internal pressure of a tire is lowered. To achieve such an aim, the rubber chafers have two layer structure consisting of a portion which is in contact with the rim and a portion disposed adjacent to the portion and forming the inside of the tire.

The following Patent Literature 7 discloses a pneumatic tire which includes: a carcass ply which is wound around bead cores from the inside to the outside in the tire width direction; and an inner liner which forms an inner surface of the tire and is made of an air non-permeable rubber member aiming at preventing chipping of a bead toe at the time of assembling a rim or at the time of removing from the rim without deteriorating the durability of the bead. The pneumatic tire has the structure where a toe inner rubber layer extending outward in the tire radial direction is formed between a terminal end surface of a rubber chafer which is disposed outside in the tire width direction and reaches and terminates at a bead toe portion and an inner surface of the inner liner in the tire width direction, the toe inner rubber layer has rubber hardness of 60 degrees or less, and the rubber hardness is increased in the ascending order of the inner liner, the toe inner rubber layer and the rubber chafer.

The following Patent Literature 8 discloses a tire which aims at the prevention of the occurrence of a damage on an inner liner at the time of assembling or removing from a rim. In the tire, an air non-permeable rubber which forms an inner liner exhibits poor adhesiveness. To increase adhesiveness of a contact portion between a rubber chafer made of hard rubber and an inner liner, a first insulation rubber layer having excellent adhesiveness is interposed between the rubber chafer and the inner liner. In the tire, rubber hardness of the first insulation rubber layer is set smaller than rubber hardness of the inner liner.

CITATION LIST

Patent Literature

PTL 1: JP-A-2007-131173
PTL 2: JP-T-2002-513360
PTL 3: JP-A-7-315013
PTL 4: JP-T-2011-530449
PTL 5: JP-A-11-348515

PTL 6: JP-A-2006-193061
PTL 7: JP-A-2002-52909
PTL 8: JP-A-2008-62662

SUMMARY OF INVENTION

Technical Problem

However, in all these known techniques disclosed in the above-mentioned Patent Literatures 1 to 3, the carcass ply is brought into direct contact with the bead cores and hence, when an inner pressure is applied to the tire, a tension is generated thus giving rise to drawbacks that the carcass ply and the bead cores rub against each other, the carcass ply or the bead core is broken, and durability is deteriorated.

In the known technique disclosed in the above-mentioned Patent Literature 4, the slit is formed in the inner liner and hence, there exists a drawback of air leakage. Further, Patent Literature 4 fails to disclose a technique for improving adhesiveness between the inner liner and the rubber chafer. In the known technique disclosed in the above-mentioned Patent Literature 5, upper and lower protective rubber layers mounted on an inner surface of the inner liner can be made of rubber having the same quality as the inner liner and hence, the upper and lower protective rubber layers have complex modulus of elasticity of 7 to 13 MPa. Accordingly, the upper and lower protective rubber layers cannot follow the deformation of the inner liner thus giving rise to a drawback that inter layer durability between the protective rubber layers and the inner liner is lowered.

All pneumatic tires disclosed in the above-mentioned Patent Literatures 6 to 8 are directed to a tire having the general-use structure, that is, a tire having the structure where the carcass ply is wound around the bead cores from the inside to the outside in the tire width direction. Accordingly, the enhancement of adhesiveness between a rubber chafer and an inner liner which the present invention aims at is not disclosed in these Patent Literatures 6 to 8.

Under such circumstances, as a result of extensive and continuous studies, inventors of the present invention have found out a pneumatic tire having the structure where a carcass ply is wound around bead cores from the outside in the tire width direction to the inside in the tire width direction, and both end portions of an inner liner extend between beads and the carcass ply and hence, the inner liner is disposed between the beads and the carcass ply as a buffer member. Due to such a constitution, a lightweight and highly rigid tire can be acquired without additionally providing a particular buffer member, and can also enhance steering stability performance thereof. The inventors of the present invention also have found out a method of manufacturing such a pneumatic tire.

The inventors of the present invention also have found out that, in the pneumatic tire having the structure where the inner liner is wound around from the inside to the outside in the tire width direction, and the carcass ply is wound around from the outside to the inside in the tire width direction, a portion of a surface on an inner liner side which is brought into contact with a rubber chafer is made of rubber having favorable adhesiveness, and the portion is covered by the rubber chafer whereby adhesiveness of the members can be increased and durability of the members can be enhanced without deteriorating air permeability.

The inventors of the present invention have also found out that, in a pneumatic tire where a carcass ply is wound around from the outside in the tire width direction to the inside in the tire width direction, and an inner liner is wound around from the inside in the tire width direction to the outside in the tire width direction, durability can be enhanced by increasing adhesiveness between the inner liner and the rubber chafer which is brought into contact with the inner liner.

Solution to Problem

A pneumatic tire according to a first aspect of the present invention is a pneumatic tire including: a pair of left and right beads including bead cores; a carcass ply extending between the bead cores; and an inner liner disposed on an inner peripheral side of the carcass ply, wherein the carcass ply is wound around the bead cores from the outside in the tire width direction to the inside in the tire width direction, and both end portions of the inner liner extend between the beads and the carcass ply respectively.

By adopting the above-mentioned constitution, in the pneumatic tire according to the present invention, due to the structure where the carcass ply is wound from the outside to the inside in the tire width direction, the distribution of tension applied to the carcass ply changes. Particularly, tension in an area ranging from a shoulder region which is disposed at an outermost side of a tire tread in the tire width direction to a largest width position of the tire is increased so that such an area exhibits high rigidity. On the other hand, by arranging the inner liner as a butter member between the beads and the carcass ply, without adding a particular buffer member, it is possible to prevent breaking of the bead core or the carcass ply caused by direct contact and rubbing between the bead core and the carcass ply when the carcass ply is brought into a high tension state without increasing a weight.

A pneumatic tire according to a second aspect of the present invention is, in the above-mentioned first invention, characterized in that a winding height of the carcass ply is 55% or less of a tire cross-section height taken upwardly in the perpendicular direction from a nominal diameter. When the winding height of the carcass ply exceeds 55% of the tire-cross section height taken in the perpendicular direction from the nominal diameter, an increase in strain in the tire is brought about due to the deflection of the tire generated during the rotation of the tire thus giving rise to a possibility that durability of the tire is adversely affected.

A pneumatic tire according to a third aspect of the present invention is, in the above-mentioned first invention, characterized in that the inner liner is wound around the bead cores from the inside in the tire width direction to the outside in the tire width direction.

A pneumatic tire according to a fourth aspect of the present invent ion is, in the above-mentioned second invention, characterized in that a winding height of the inner liner is 5% or less of the tire cross-section height taken upwardly in the perpendicular direction from the nominal diameter. When the winding height of the inner liner exceeds 5% of the tire cross-section height taken in the perpendicular direction from the nominal diameter, an increase in an undesired weight is brought about thus giving rise to a possibility that performances of the tire such as rolling resistance are adversely affected.

A pneumatic tire according to a fifth aspect of the present invention is, in the above-mentioned first invention, characterized in that a rubber chafer is disposed around the bead cores.

A pneumatic tire according to a sixth aspect of the present invention is, in the above-mentioned fifth invention, characterized in that the rubber chafers are disposed so as to cover at least wound end portions of the carcass ply.

A pneumatic tire according to a seventh aspect of the present invention is, in the above-mentioned fifth invention, characterized in that adhesion-reinforcing rubber layers for adhering the rubber chafers are provided to portions of the inner liner, and a 300% modulus value of the adhesion-reinforcing rubber layer is higher than a 300% modulus value of the inner liner and is lower than a 300% modulus value of the rubber chafer.

By adopting the above-mentioned constitution, in the pneumatic tire according to the present invention, it is possible to increase adhesiveness between the adhesion-reinforcing rubber layer provided to the portion of the inner liner and the rubber chafer.

A pneumatic tire according to an eighth aspect of the present invention is, in the above-mentioned seventh invention, characterized in that the 300% modulus value of the adhesion-reinforcing rubber layer falls within a range of from 4.1 MPa to 6.1 MPa, and the 300% modulus value of the inner liner falls within a range of from 3.0 MPa to 4.0 MPa. It is desirable that a 300% modulus value of the rubber chafer be less than or equal to 14 MPa.

A pneumatic tire according to a ninth aspect of the present invention is, in the above-mentioned seventh invention, characterized in that the adhesion-reinforcing rubber layer is disposed within a range of 5% to 55% of a vertical height from a lower end of the bead to an upper end of a tire tread surface as measured from the lower end.

A pneumatic tire according to a tenth aspect of the present invention is, in the above-mentioned seventh invention, characterized in that the upper end of the adhesion-reinforcing rubber layer is covered by the rubber chafer.

A pneumatic tire according to an eleventh aspect of the present invention is, in the above-mentioned fifth invention, characterized in that the rubber chafer has a low modulus layer and a high modulus layer which differ from each other in a 300% modulus value, and the low modulus layer is disposed at least at a position where the rubber chafer is brought into contact with the inner liner.

By adopting the above-mentioned constitution, in the pneumatic tire according to the present invention, the adhesiveness between the low modulus layer of the rubber chafer and the inner liner can be increased.

A pneumatic tire according to a twelfth aspect of the present invention is, in the above-mentioned eleventh invention, characterized in that a 300% modulus value of the low modulus layer falls within a range of from 3.5 MPa to 8.0 MPa, and is more than or equal to the 300% modulus value of the inner liner.

A pneumatic tire according to a thirteenth aspect of the present invention is, in the above-mentioned eleventh invention, characterized in that the low modulus layer of the rubber chafer disposed on an outer surface side of the rubber chafer extends to a bead toe from an upper end portion of the rubber chafer on a tire inner surface side.

A method of manufacturing a pneumatic tire according to a fourteenth aspect of the present invention is a method of manufacturing a pneumatic tire including the steps of: laminating an inner liner onto a building drum; placing a pair of beads including bead cores and bead fillers on the inner liner at equal distances with respect to the center of a tire width; winding both end portions of the inner liner around the beads to the outside in the tire width direction, and pressure-bonding the bead fillers to the inner liner; laminating a carcass ply to the bead fillers pressure-bonded to the inner liner; laminating side wall rubbers to the carcass ply; forming a green case by pressure-bonding the carcass ply and the side wall rubbers to a wound portion of the inner liner, and by folding back both end portions of the carcass ply toward an inner peripheral side of the bead; and enlarging the green case, and laminating the green case to a tread ring formed of a belt and a tread rubber and, thereafter, winding both end portions of the carcass ply around the beads to the inside in the tire width direction.

In the method of manufacturing a pneumatic tire according to the present invention, both end portions of the carcass ply are wound and pressure-bonded to the inner surface of the tire in the final step and hence, the tire can be built with high accuracy.

A method of manufacturing a pneumatic tire according to a fifteenth aspect of the present invention is, in the above-mentioned fourteenth invention, characterized in that the method of manufacturing a pneumatic tire further includes the steps of: laminating the side wall rubbers to the carcass ply and laminating the rubber chafers to both end portions of the carcass ply; forming a green case by pressure-bonding the carcass ply and the side wall rubbers to the wound portions of the inner liner, and by folding back both end portions of the carcass ply toward an inner peripheral side of the beads together with the rubber chafers; and enlarging the green case, laminating the green case to the tread ring formed of a belt and a tread rubber and, thereafter, winding both end portions of the carcass ply to the inside in the tire width direction of the beads together with the rubber chafers thus covering a winding portion of the carcass ply by the rubber chafers.

Advantageous Effects of Invention

The pneumatic tire of the present invention is, as described above, configured such that the carcass ply is wound around the bead cores from the outside in the tire width direction to the inside in the tire width direction, and both end portions of the inner liner extend between the beads and the carcass ply. Accordingly, the present invention can acquire a lightweight and highly rigid tire and hence, the present invention can enhance steering stability performance.

Further, in the pneumatic tire of the present invention, the adhesiveness between the adhesion-reinforcing rubber layer provided to a portion of the inner liner and the rubber chafer can be increased as described above and hence, followability of the tire is enhanced due to the deformation of the inner liner and the rubber chafer whereby durability is enhanced.

Further, in the pneumatic tire of the present invention, the low modulus layer which constitutes the rubber chafer increases the adhesiveness between the inner liner and the rubber chafer as described above and hence, durability and steering stability of the tire are enhanced without lowering the performance of the rubber chafer of preventing rubbing against a rim.

DESCRIPTION OF EMBODIMENTS

A pneumatic tire according to the present invention has the structure where a carcass ply is wound around bead cores from the outside in the tire width direction to the inside in the tire width direction, and both end portions of the inner liner extend between the bead and the carcass ply.

Hereinafter, preferred embodiments according to the present invention are explained in detail by reference to drawings.

Embodiment 1

Figure 1:
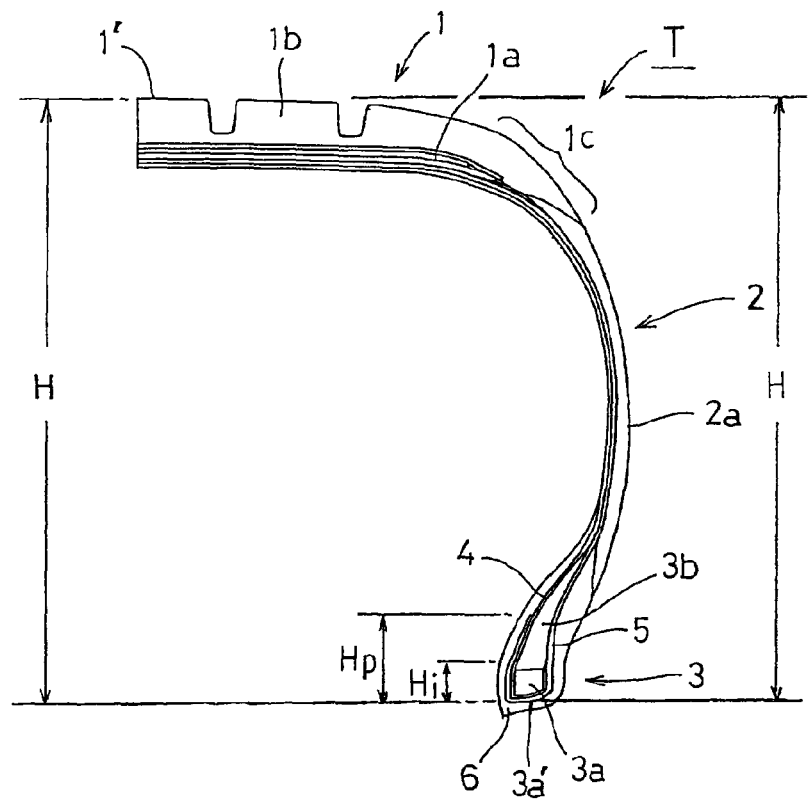
FIG. 1 is a schematic partial cross-sectional view of a pneumatic tire according to an embodiment 1 of the present invention.
Figure 2:
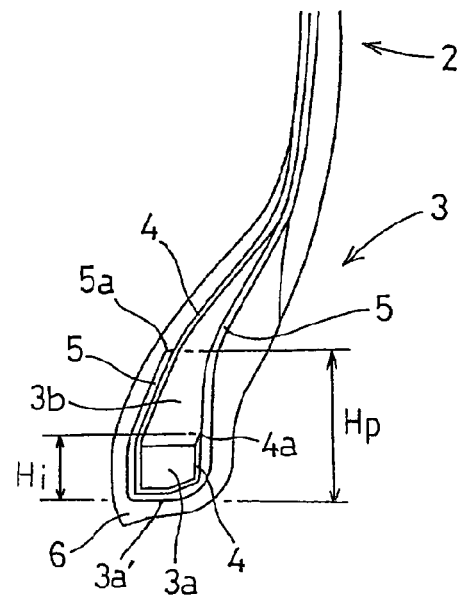
FIG. 2 is a partially enlarged view of a bead shown in FIG. 1 and an area around the bead.

FIG. 1 and FIG. 2 show an embodiment 1. Symbol T in the drawings indicates a pneumatic tire. The pneumatic tire T includes a tire tread 1, sidewalls 2 and beads 3. The tire tread 1 includes a belt, a belt reinforcement 1a and a tread rubber 1b. The bead 3 includes: a bead core 3a; and a bead filler 3b made of hard rubber which extends outward in the tire radial direction from the bead core 3a.

Symbol 4 indicates an inner liner disposed on a tire inner surface. Both end portions of the inner liner 4 extend between the bead and the carcass ply. Although the constitution of both end portions of the inner liner 4 is not particularly limited, it is preferable in view of durability that both end portions of the inner liner 4 be wound around the bead cores 3a from the inside to the outside in the tire width direction.

Symbol 5 indicates a carcass ply. The carcass ply 5 is arranged so as to extend between the bead cores 3a in a straddling manner over the tire tread 1, the sidewalls 2 and the beads 3. The carcass ply 5 is wound around the bead cores 3a from the outside in the tire width direction to the inside in the tire width direction.

The inner liner 4 and the carcass ply 5 are arranged such that the inner liner 4 is arranged inside the carcass ply 5 around the bead cores 3a.

Symbol 6 indicates rubber chafers. The rubber chafers 6 are arranged so as to cover the inner liners 4 and the carcass ply 5 around the bead cores 3a. To be more specific, the rubber chafers 6 are arranged such that an end portion of each rubber chafer 6 is terminated on the inner liner 4 so as to cover a portion of the bead 3 which is brought into contact with a rim when the rim is assembled onto the tire and, at the same time, to cover at least a wound end portion 5a of the carcass ply 5. Due to such a constitution, none of the followings: the inner liner 4; the carcass ply 5; end portions 4a of the inner liner 4 and the end portions 5a of the carcass ply 5 are exposed on surfaces of the beads 3.

A height Hi of the position of the wound end portion 4a of the inner liner 4 is designed to 5% of a tire cross-section height H in the perpendicular direction from a nominal diameter, that is, to 5% of a distance from a lower end 3a' of the bead 3 to a top portion 1' of the tire tread 1 disposed above the lower end 3a' in the perpendicular direction in a state where the tire of the present invention is assembled onto the rim. When the winding height Hi of the inner liner 4 exceeds 5% of the tire cross-section height H, an increase in an undesired mass is brought about thus giving rise to a possibility that performances of the tire such as rolling resistance are adversely affected.

A height Hp of the position of the wound end portion 5a of the carcass ply 5 is designed to 55% of the tire cross-section height H in the perpendicular direction from the nominal diameter. When the winding height Hp of the carcass ply 5 exceeds 55% of the tire-cross section height H, an increase in strain in the tire is brought about due to the deflection of the tire generated during the rotation of the tire thus giving rise to a possibility that durability of the tire is adversely affected.

As described above, the pneumatic tire T according to this embodiment has the structure where the carcass ply 5 is wound from the outside to the inside in the tire width direction. Accordingly, the distribution of tension applied to the carcass ply 5 changes, particularly, tension applied to the carcass ply 5 in an area ranging from a shoulder region 1c of the tire tread 1 to a maximum width position 2a of the tire is increased so that the tire exhibits high rigidity in such an area. In the pneumatic tire T according to this embodiment, the inner liner 4 is arranged between the bead 3 and the carcass ply 5 so that the bead core 3a and the carcass ply 5 are not brought into direct contact with each other. Due to such a constitution, it is unnecessary to additionally arrange a particular buffer member for preventing breaking of the bead core or the carcass ply due to the direct contact and rubbing between the bead core and the carcass ply which may occur when the pneumatic tire T is brought into a high tension state. Accordingly, it is possible to prevent the breaking of the bead core or the carcass ply without increasing a weight of the tire.

Next, a method of manufacturing the pneumatic tire T shown in the above-mentioned embodiment 1 is explained.

Figure 3:
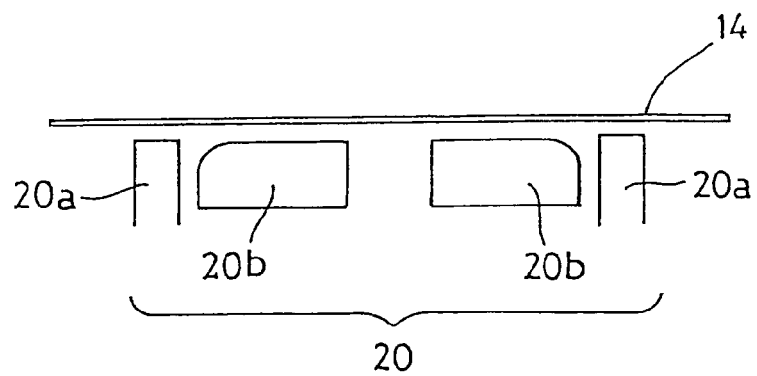
FIG. 3 is a schematic view showing a step of a method of manufacturing the pneumatic tire of the present invention, and showing a state where an inner liner is laminated to a tire building drum.
Figure 4:
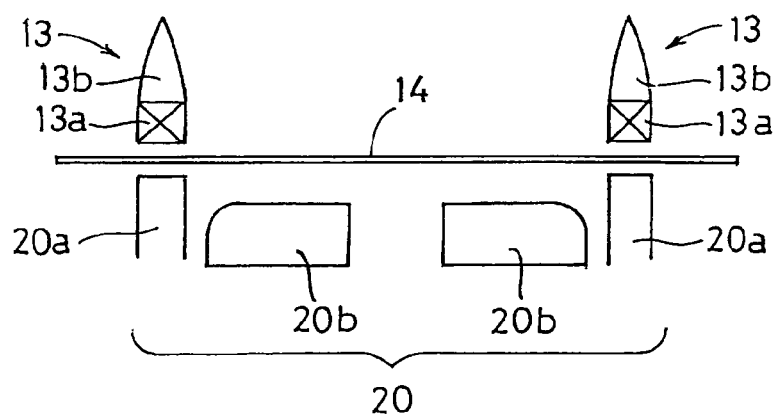
FIG. 4 is a schematic view showing a step of the method of manufacturing the pneumatic tire of the present invention, and showing a state where the bead is mounted on the inner liner.
Figure 5:
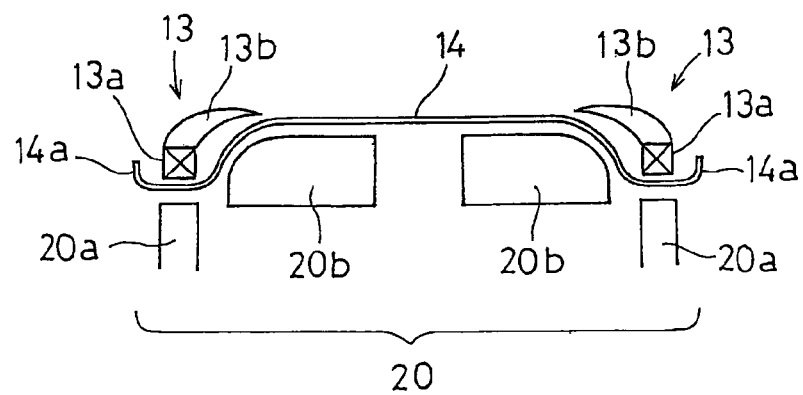
FIG. 5 is a schematic view showing a step of the method of manufacturing the pneumatic tire of the present invention, and showing a state where bead filler is pressure-bonded to the inner liner.

Firstly, as shown in FIG. 3, an inner liner 14 is laminated to a tire building drum 20 which includes bead sets 20a and cores 20b. Then, as shown in FIG. 4, a pair of beads 13 each of which includes a bead core 13a and a bead filler 13b is placed on the inner liner 14 at an equal distance with respect to the center of the tire width. Next, as shown in FIG. 5, the inner liner 14 is enlarged and, at the same time, both end portions 14a of the inner liner 14 are wound to the outside of the beads 13. Then, the bead fillers 13b are inclined toward the center side of the tire width, and are pressure-bonded to the inner liner 14.

Figure 6:
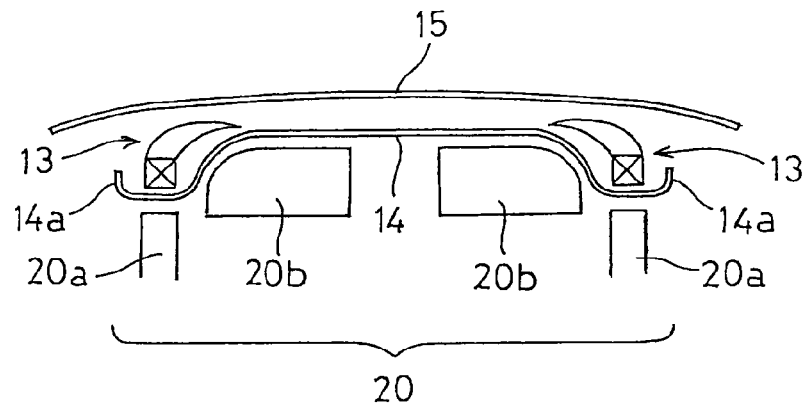
FIG. 6 is a schematic view showing a step of the method of manufacturing the pneumatic tire of the present invention, and showing a state where a carcass ply is adhered to the inner liner.
Figure 7:
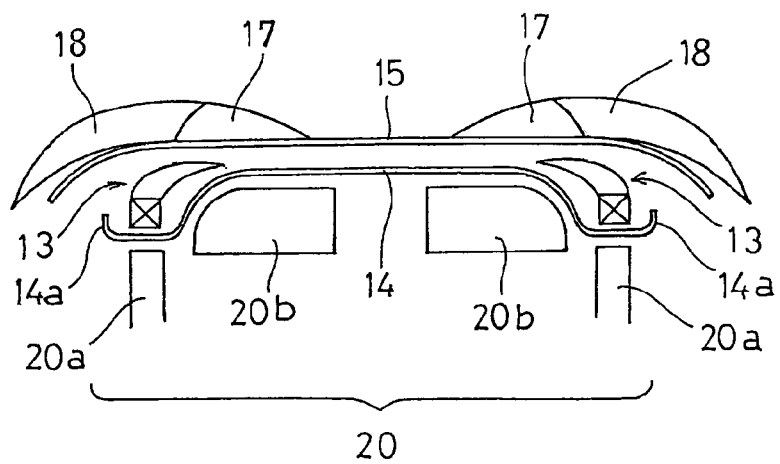
FIG. 7 is a schematic view showing a step of the method of manufacturing the pneumatic tire of the present invention, and showing a state where sidewall rubbers and rubber chafers are adhered to the carcass ply.
Figure 8:
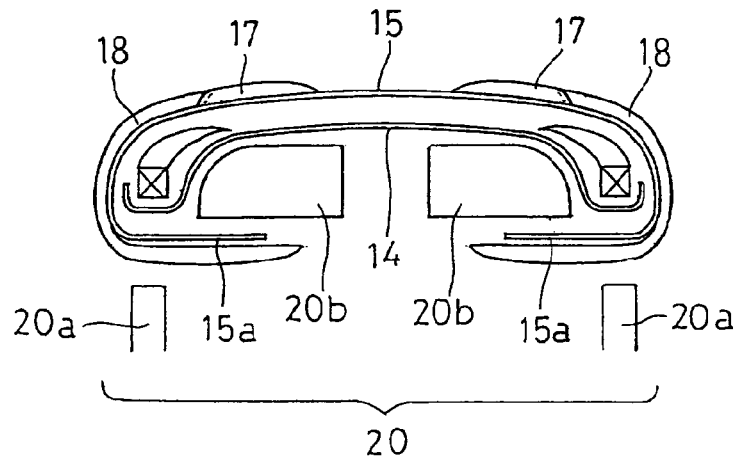
FIG. 8 is a schematic view showing a step of the method of manufacturing the pneumatic tire of the present invention, and showing a state where both end portions of the carcass ply are folded to the inside of the beads.

Then, as shown in FIG. 6, a carcass ply 15 is laminated to the bead fillers 13b which are pressure-bonded to the inner liner 14. Next, as shown in FIG. 7, sidewall rubbers 17 and rubber chafers 18 are laminated to the carcass ply 15. Then, as shown in FIG. 8, the rubber chafers 18 are folded back to areas below the bead cores 13a respectively together with both end portions 15a of the carcass ply 15 while covering both end portions 14a of the inner liner 14 which are wound to the outside of the bead 13 by the carcass ply 15 and the rubber chafers 18 thus forming a green case. Due to such a constitution, both end portions 14a of the inner liner 14 which are wound to the outside of the bead 13 are positioned inside the carcass ply 15. The term "green case" indicates an intermediate product of an unvulcanized tire formed by laminating the inner liner, the beads, the carcass ply, the sidewall rubbers, and the rubber chafers.

Figure 9:
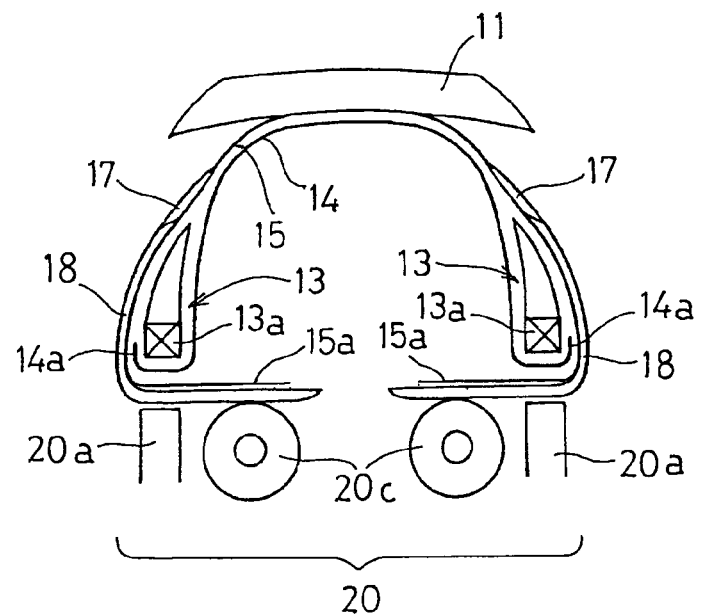
FIG. 9 is a schematic view showing a step of the method of manufacturing the pneumatic tire of the present invention, and showing a state where a tread ring is integrated on the carcass ply.
Figure 10:
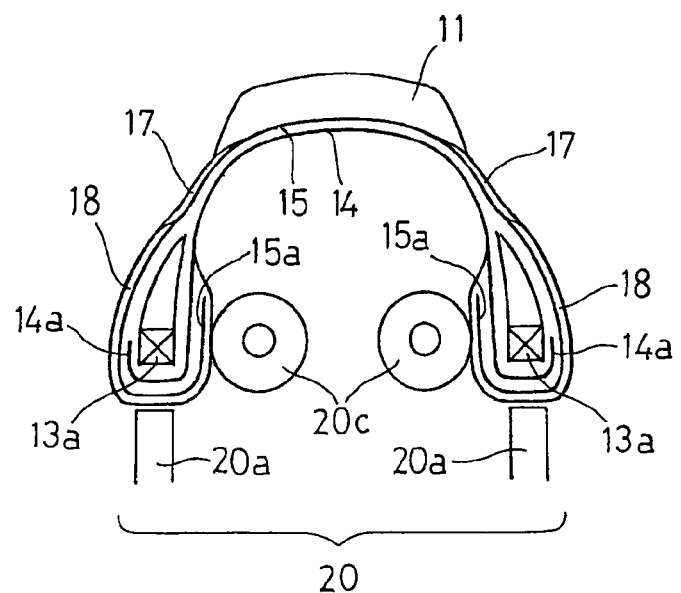
FIG. 10 is a schematic view showing a step of the method of manufacturing the pneumatic tire of the present invention, and showing a state where both end portions of the carcass ply are wound to the inside of the bead.

Next, as shown in FIG. 9, the green case is expanded using a usual method, and a tread ring 11 formed of a belt and a tread rubber is laminated to the inner liner 14 in the green case. Thereafter, as shown in FIG. 10, the rubber chafers 18 are wound and pressure-bonded to the inside of the beads 13 together with both end portions 15a of the carcass ply 15 using stitcher rolls 20c. Accordingly, both wound end portions 15a of the carcass ply 15 are covered by the rubber chafers 18 respectively.

By performing the above-mentioned steps, the pneumatic tire T shown in the embodiment 1 is manufactured.

[Comparison Test]

Next, a comparison test is carried out with respect to the pneumatic tire according to the present invention under the following conditions. The comparison test is carried out by comparing the above-mentioned embodiment 1 and the following comparison example 1 and conventional example 1.

Size of test tire: 195/65R15 91H
Vehicle used for test: sedan-type vehicle car made in Japan with displacement of 1.8 L Constitution of Comparison Example 1

In summary, the pneumatic tire of the comparison example 1 has the structure where a carcass ply is wound around bead cores from the outside to the inside in the tire width direction, and an inner liner is wound from the inside to the outside in the tire width direction in a state where the inner liner is disposed on an outer side of the carcass ply in an overlapping manner. That is, the difference between the pneumatic tire T of the embodiment 1 and the pneumatic tire of the comparison example 1 lies in that the inner liner is positioned inside the carcass ply in the pneumatic tire T of the embodiment 1, while the inner liner is positioned outside the carcass ply in the pneumatic tire of the comparison example 1.

Constitution of Conventional Example 1

In summary, the pneumatic tire of a conventional example 1 has the structure where a carcass ply is wound around bead cores from the inside to the outside in the tire width direction, and an inner liner is wound from the inside to the outside in the tire width direction in a state where the inner liner is disposed on an outer side of the carcass ply in an overlapping manner. That is, the difference between the pneumatic tire T of the embodiment 1 and the pneumatic tire of the conventional example 1 lies in that the inner liner is positioned inside the carcass ply, the inner liner is wound from the inside to the outside in the tire width direction, and the carcass ply is wound from the outside to the inside in the tire width direction in the pneumatic tire T of the embodiment 1, while the inner liner is positioned outside the carcass ply, and both inner liner and carcass ply are wound from the inside to the outside in the tire width direction in the pneumatic tire of the conventional example 1.

TABLE 1

|  | conventional example 1 | comparison example 1 | embodiment 1 |
| --- | --- | --- | --- |
| weight reduction effect | 100 | 95 | 100 |
| durability | 100 | 90 | 100 |
| lateral rigidity | 100 | 110 | 110 |
| steering stability | 100 | 102 | 105 |

In Table 1, "weight reduction effect" is provided for evaluating weight reduction effects of the embodiment 1 and the comparison example 1. The weight reduction effect is evaluated in such a manner that tire masses of the tire of the conventional example 1, the tire of the embodiment 1 and the tire of the comparison example 1 are measured respectively, and the weight reduction effects of the embodiment 1 and the conventional example 1 are evaluated respectively by indexes with the measurement result of the conventional example 1 taken as an index of 100. In "weight reduction effect", the larger the index, the higher the weight reduction effect becomes.

In Table 1, "durability" is provided for evaluating durability of the embodiment 1 and the durability of the comparison example 1. The durability is evaluated in such a manner that a traveling distance that a vehicle travels until a tire failure occurs is measured with respect to the tire of the embodiment 1, the tire of the comparison example 1 and the tire of the conventional example 1 using a test method in accordance with FMVSS139, and the durability of the embodiment 1 and the durability of the comparison example 1 are evaluated by indexes with the measurement result of the conventional example 1 taken as an index of 100. With "durability", the larger the index, the higher the durability becomes.

In Table 1, "lateral rigidity" is provided for evaluating lateral rigidity of the embodiment 1 and the comparison example 1. The lateral rigidity is evaluated as follows. In a state where a reference load value (4.2 kN) is applied to a tire using a compression testing machine, a force in the lateral direction which is 30% of the reference load is further applied to the tire. In such a state, an amount of lateral deflection is measured with respect to the tire of the embodiment 1, the tire of the comparison example 1 and the tire of the conventional example 1. Then, lateral rigidity is measured by dividing the force in the lateral direction by a measurement value of the amount of lateral deflection. The lateral rigidity of the embodiment 1 and the lateral rigidity of the comparison example 1 are evaluated by indexes with the measurement result of the conventional example 1 taken as an index of 100. With "lateral rigidity", the larger the index, the higher the lateral rigidity becomes.

In Table, "steering stability" is provided for evaluating steering stability of the embodiment 1 and the steering stability of the comparison example 1. The steering stability is evaluated in such a manner that a vehicle used for the test is subjected to actual vehicle traveling at a speed of 100 km/h on a dry road, and a driver performs a function evaluation with respect to the steering stability. The steering stability of the embodiment 1 and the steering stability of the comparison example 1 are evaluated by indexes with the function evaluation of the conventional example 1 taken as an index of 100. With "steering stability", the larger the index, the higher the steering stability becomes.

[Results of Comparison Tests]

With respect to the weight reduction effect, the result is obtained that the pneumatic tire of the comparison example 1 is inferior to the pneumatic tire of the embodiment 1. From this result, it is found that the constitution where the inner liner is positioned inside the carcass ply enhances the weight reduction effect.

With respect to durability, the result is obtained that the pneumatic tire of the comparison example 1 is inferior to the pneumatic tire of the embodiment 1. From this result, it is found that the constitution where the inner liner is positioned inside the carcass ply enhances durability.

With respect to lateral rigidity, the result is obtained that the pneumatic tire of the embodiment 1 is substantially equal to the pneumatic tire of the comparison example 1, and is superior to the pneumatic tire of the conventional example 1. From this result, it is found that the constitution where the carcass ply is wound from the outside to the inside in the tire width direction enhances lateral rigidity.

With respect to steering stability, the result is obtained that the pneumatic tire of the comparison example 1 is superior to the pneumatic tire of the conventional example 1, and the pneumatic tire of the embodiment 1 is superior to the pneumatic tire of the comparison example 1. From this result, it is found that the constitution where the carcass ply is wound from the outside to the inside in the tire width direction enhances the steering stability, and the constitution where the inner liner is positioned inside the carcass ply further enhances the steering stability.

From the above-mentioned test results, it is found that the constitution where the carcass ply is wound from the outside to the inside in the tire width direction, and the inner liner is positioned inside the carcass ply enhances all of the weight reduction effect, the durability and the steering stability.

Embodiment 2

Figure 11:
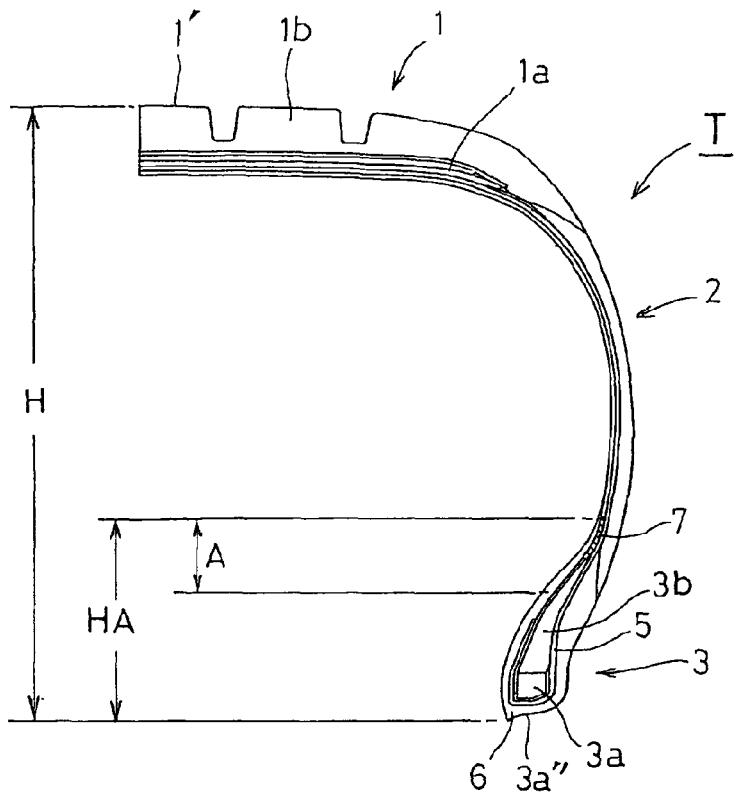
FIG. 11 is a schematic partial cross-sectional view of a pneumatic tire according to an embodiment 2 of the present invention.
Figure 12:
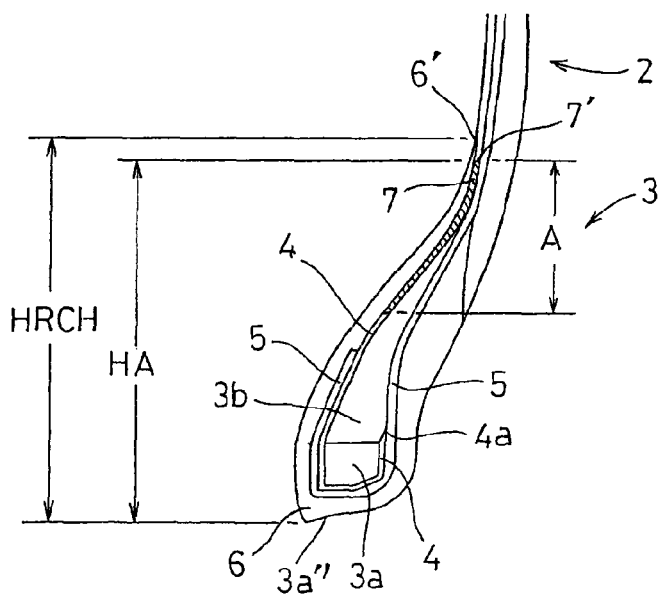
FIG. 12 is a partially enlarged view of the pneumatic tire shown in FIG. 11.

FIG. 11 and FIG. 12 show an embodiment 2. Symbol T in the drawings indicates a pneumatic tire. The pneumatic tire T includes a tire tread 1, sidewalls 2 and beads 3. The tire tread 1 includes a belt, a belt reinforcement 1a and a tread rubber 1b. The bead 3 includes a bead core 3a and a bead filler 3b which is made of hard rubber and extends outward in the tire radial direction from the bead core 3a.

Symbol 4 indicates an inner liner disposed on a tire inner surface. The inner liner 4 is wound around the bead cores 3a from the inside in the tire width direction to the outside in the tire width direction. Symbol 5 indicates a carcass ply. The carcass ply 5 is arranged so as to extend between the bead cores 3a in a straddling manner over the tire tread 1, the sidewalls 2 and the beads 3. The carcass ply 5 is wound around the bead cores 3a from the outside in the tire width direction to the inside in the tire width direction. The inner liner 4 and the carcass ply 5 are arranged such that the inner liner 4 is disposed inside the carcass ply 5 around the bead cores 3a.

Symbol 6 indicates a rubber chafer. The rubber chafer 6 is arranged so as to cover the inner liner 4 and the carcass ply 5 around the bead cores 3a. Due to such a constitution, none of the followings: the inner liner 4; the carcass ply 5; end portions 4a of the inner liner 4 and end portions 5a of the carcass ply 5 are exposed on surfaces of the beads 3.

In the inner liner 4, an adhesion-reinforcing rubber layer 7 is provided to a portion of an inner side in the tire width direction, and an upper end 7' of the adhesion-reinforcing rubber layer 7 is covered by the rubber chafer 6. That is, assuming a vertical height from a lower end 3a" of the bead to an upper end 6' of the rubber chafer 6 as HRCH and a height from the lower end 3a" of the bead to the upper end 7' of the adhesion-reinforcing rubber layer 7 as HA, a value of HRCH is set larger than a value of HA. On the other hand, when HA is set larger than HRCH, air permeability is deteriorated so that there exists a possibility that air will leak and, at the same time, the durability is lowered.

Assuming that a vertical height from the lower end 3a" of the bead to an upper end 1' of a tire tread surface as H, a height of the adhesion-reinforcing rubber layer 7 in the inner liner 4 occupies a value which falls within a range A of from 20% to 33% of the vertical height H. It is preferable that the adhesion-reinforcing rubber layer 7 occupy a value which falls within a range of from 5% to 55% of the vertical height H (5 to 25 mm in terms of a length) as measured from the lower end in the vertical height H. When the lower end of the adhesion-reinforcing rubber layer 7 is disposed at a position which is less than 5% of the vertical height H or when the upper end of the adhesion-reinforcing rubber layer 7 is disposed at a position which exceeds 55% of the vertical height H, the durability is lowered. When a length of the adhesion-reinforcing rubber layer 7 is less than 5 mm, sufficient adhesiveness cannot be acquired. On the other hand, when the length of the adhesion-reinforcing rubber layer 7 exceeds 25 mm, air permeability is deteriorated thus giving rise to a possibility that air will leak.

In this embodiment, a 300% modulus value of the rubber chafer 6 is 10.0 MPa, a 300% modulus value of the inner liner 4 is 3.0 MPa, and a 300% modulus value of the adhesion-reinforcing rubber layer 7 is 4.2 MPa which is a value falling within a range between the 300% modulus value of the rubber chafer 6 and the 300% modulus value of the inner liner 4. By setting the 300% modulus values as described above, adhesiveness between the adhesion-reinforcing rubber layer 7 and the rubber chafer 6 is increased. It is preferable that a 300% modulus value of the adhesion-reinforcing rubber layer be set to a value which falls within a range of from 4.1 MPa to 6.1 MPa, a 300% modulus value of the inner liner be set to a value which falls within a range of from 3.0 MPa to 4.0 MPa, and a 300% modulus value of the rubber chafer be set to a value less than or equal to 14 MPa. With respect to hardness in accordance with JIS K 6253, it is preferable that hardness of the adhesion-reinforcing rubber layer be set to a value which falls within a range of from 56 to 65, hardness of the inner liner be set to a value which falls within a range of from 50 to 55, and hardness of the rubber chafer 6 be set to a value which falls within a range of from 66 to 70.

Due to the above-mentioned constitution, this embodiment can increase adhesiveness and hence, durability is enhanced. Air permeability is also increased and hence, air does not leak.

[Comparison Test]

Next, a comparison test is carried out with respect to the pneumatic tire according to the present invention under the following conditions. The comparison test is carried out by comparing the following conventional example 2, the above-mentioned embodiment 2, the following embodiment 3, an embodiment 4 and a comparison example 2.

Test tire: 195/65R15 91H

Test Items

To evaluate air permeability resistance, tires are assembled on rims of 15×6 J, the tires are filled with air until an inner pressure becomes 240 kPa, and the tires are left for 6 months in an environment where a temperature is 23° C. and a pressure is 1 atmospheric pressure. Thereafter, a lowering amount of the inner pressure is measured. The air permeability resistances of the embodiment 2, the embodiment 3, the embodiment 4 and the conventional example 2 are evaluated by indexes with an evaluation of the comparison example 2 taken as an index of 100. With "air permeability resistance", the larger the index, the higher the air permeability resistance becomes.

To evaluate the durability a traveling distance that a vehicle travels until a tire failure occurs is measured using a test method in accordance with FMVSS139. The durability of the tires are evaluated by indexes with the result of the conventional example 2 taken as an index of 100. With "durability", the larger the index, the higher the durability becomes.

In order to evaluate the lateral rigidity, in a state where a reference load value (4.2 kN) is applied to a tire using a compression testing machine, a force in the lateral direction which is 30% of the reference load is further applied to the tire, an amount of lateral deflection is measured, and the lateral rigidity is measured by dividing the force in the lateral direction by a measurement value of the amount of lateral deflection. The lateral rigidities are evaluated by indexes with the measurement result of the conventional example 2 taken as an index of 100. With "lateral rigidity", the larger the index, the higher the lateral rigidity becomes.

Constitution of Conventional Example 2

In summary, the structure of a pneumatic tire of the conventional example 2 is the general tire structure. That is, the pneumatic tire of the conventional example 2 has the structure where a carcass ply is wound around bead cores from the inside to the outside in the tire width direction, an inner liner is wound from the inside to the outside in the tire width direction in an overlapping manner on an outer side of the carcass ply, and the adhesion-reinforcing rubber layer is not provided.

Constitution of Comparison Example 2

In summary, the pneumatic tire of the comparison example 2 has the structure where a carcass ply is wound around bead cores from the outside to the inside in the tire width direction, an inner liner is wound from the inside to the outside in the tire width direction in an overlapping manner on an outer side of the carcass ply. Further, in the structure of pneumatic tire of the comparison example 2, beads and the carcass ply are brought into direct contact with each other, rubber chafers and the inner liner are brought into direct contact with each other, and an adhesion-reinforcing rubber layer is not provided.

Constitution of Embodiment 2

In summary, the pneumatic tire of the embodiment 2 has the structure where the carcass ply is wound from the outside to the inside in the tire width direction, and the adhesion-reinforcing rubber layers are covered by the rubber chafers.

Embodiment 3

Constitution of Embodiment 3

A tire of the embodiment 3 has the substantially same structure as the tire of the embodiment 2, while a 300% modulus value of an adhesion-reinforcing rubber layer is set to 5.0 MPa.

Embodiment 4

Constitution of Embodiment 4

A tire of the embodiment 4 has the substantially same structure as the tire of the embodiment 2, while a 300% modulus value of an adhesion-reinforcing rubber layer is set to 5.9 MPa.

TABLE 2

| contents | conventional example 2 | comparison example 2 | embodiment 2 | embodiment 3 | embodiment 4 |
|---|---|---|---|---|---|
| covering ratio by rubber chafer | — | — | 100% | 100% | 100% |
| modulus value of inner liner layer | 3.0 | 3.0 | 3.5 | 3.5 | 3.5 |
| modulus value of rubber chafer layer | 10.0 | 10.0 | 10.0 | 10.0 | 10.0 |
| modulus value of adhesion-reinforcing rubber layer | — | — | 4.2 | 5.0 | 5.9 |
| air permeability resistance | 100 | 100 | 101 | 100 | 102 |
| durability | 100 | 60 | 100 | 102 | 105 |
| lateral rigidity of tire | 100 | 110 | 110 | 110 | 110 |

[Result of Comparison Test]

The tire of the comparison example 2 has the structure where a carcass ply is wound around bead cores from the outside to the inside in the tire width direction, and the inner liner is wound from the inside to the outside in the tire width direction in an overlapping manner on an outer side of the carcass ply. Accordingly, the tire of the comparison example 2 exhibits excellent lateral rigidity. However, the tire of the comparison example 2 is not provided with the adhesion-reinforcing rubber layer and hence, the tire of the comparison example 2 exhibits low durability.

The tire of the embodiment 2 has no problem with air permeability resistance. The embodiment 2 has the structure where the carcass ply is wound around bead cores from the outside to the inside in the tire width direction, and the inner liner is wound from the inside to the outside in the tire width direction and positioned inside of the carcass ply. Accordingly, the tire of the embodiment 2 exhibits excellent lateral rigidity. Further, the tire of the embodiment 2 is also provided with adhesion-reinforcing rubber layers and hence, durability of the tire of the embodiment 2 is enhanced compared with the durability of the tire of the comparison example 2. However, a 300% modulus value of the adhesion-reinforcing rubber layer is set to 4.2 MPa. Accordingly, the durability of the tire of the embodiment 2 is substantially equal to durability of the tire of the conventional example 2 having the general structure where the carcass ply is wound around bead cores from the inside to the outside in the tire width direction, and the inner liner is wound from the inside to the outside in the tire width direction in an overlapping manner on an outer side of the carcass ply.

The tire of the embodiment 3 has no problem with air permeability resistance. In the same manner as the embodiment 2, the embodiment 3 has the structure where the carcass ply is wound around the bead cores from the outside to the inside in the tire width direction, and the inner liner is wound from the inside to the outside in the tire width direction and positioned inside of the carcass ply. Accordingly, the tire of the embodiment 3 exhibits excellent lateral rigidity. Further, a 300% modulus value of the adhesion-reinforcing rubber layer is set to 5.0 MPa and hence, the durability of the tire of the embodiment 3 is enhanced compared with the durability of the tire of the embodiment 2.

The tire of the embodiment 4 has no problem with air permeability resistance. In the same manner as the embodiment 2, the embodiment 4 has the structure where the carcass ply is wound around the bead cores from the outside to the inside in the tire width direction, and the inner liner is wound from the inside to the outside in the tire width direction and positioned inside of the carcass ply. Accordingly, the tire of the embodiment 4 exhibits excellent lateral rigidity. Further, a 300% modulus value of the adhesion-reinforcing rubber layer is set to 5.9 MPa. and hence, the durability of the tire of the embodiment 4 is enhanced compared with the durability of the tire of the embodiment 3.

From the above-mentioned test results, it is found that when the tire has the constitution where the carcass ply is wound from the outside to the inside in the tire width direction and the inner liner is positioned inside the carcass ply, and the adhesiveness between the inner liner and the rubber chafers is enhanced by providing the adhesion-reinforcing rubber layers having favorable adhesiveness to portions of the inner liner, the tire can enhance all of the air permeability resistance, the durability and the lateral rigidity.

Embodiment 5

Figure 13:
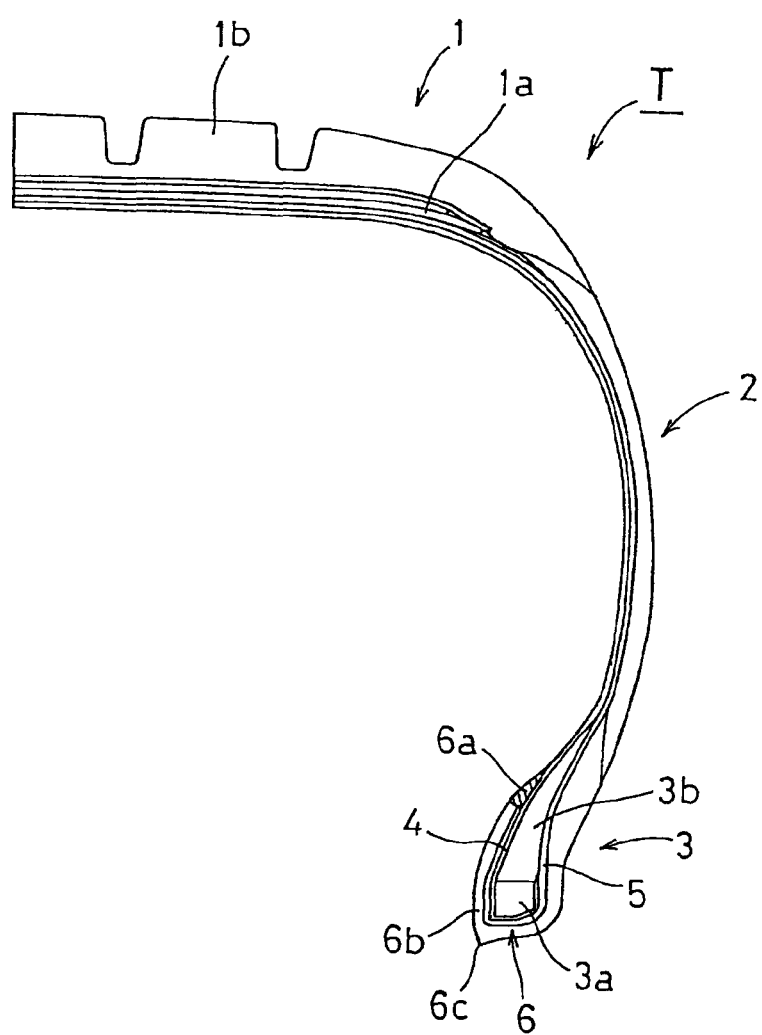
FIG. 13 is a schematic partial cross-sectional view of a pneumatic tire according to an embodiment 5 of the present invention.
Figure 14:
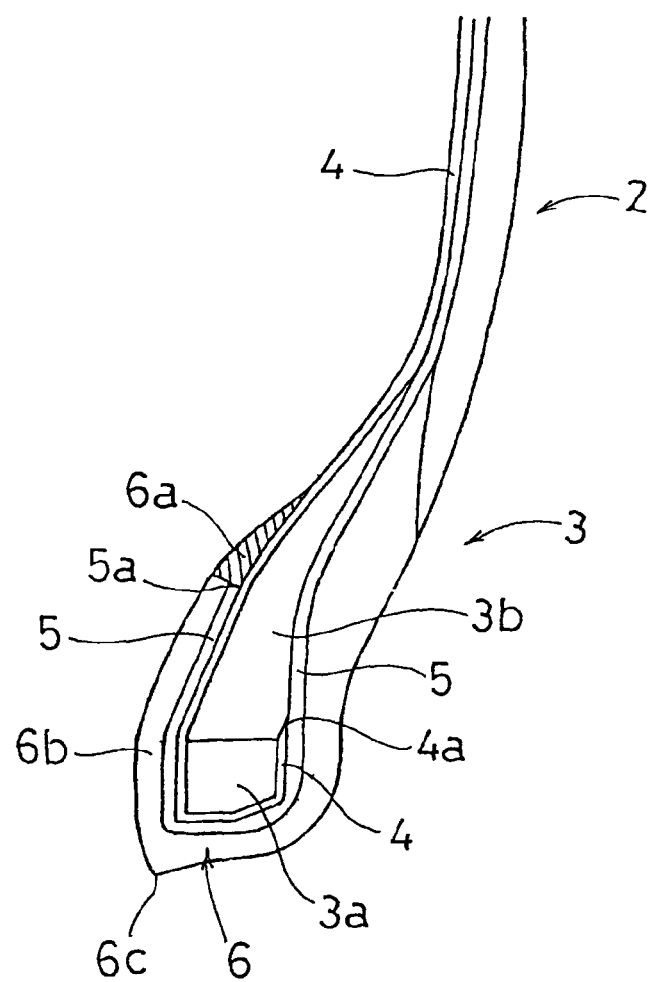
FIG. 14 is a partially enlarged view of the pneumatic tire shown in FIG. 13.

FIG. 13 and FIG. 14 show an embodiment 5. Symbol T in the drawings indicates a pneumatic tire. The pneumatic tire T includes a tire tread 1, sidewalls 2 and beads 3. The tire tread 1 includes a belt, a belt reinforcement 1a and a tread rubber 1b. The bead 3 includes a bead core 3a and a bead filler 3b made of hard rubber and extending outward in the tire radial direction from the bead core 3a.

Symbol 4 indicates an inner liner disposed on a tire inner surface. The inner liner 4 is wound around the bead cores 3a from the inside in the tire width direction to the outside in the tire width direction. Symbol 5 indicates a carcass ply.

The carcass ply 5 is arranged so as to extend between left and right bead cores 3a in a straddling manner over the tire tread 1, the sidewalls 2 and the beads 3. The carcass ply 5 is wound around the bead cores 3a from the outside in the tire width direction to the inside in the tire width direction. The inner liner 4 and the carcass ply 5 are arranged such that the inner liner 4 is disposed inside the carcass ply 5 around the bead cores 3a.

Symbol 6 indicates a rubber chafer. The rubber chafers 6 are arranged so as to cover the inner liner 4 and the carcass ply 5 around the bead cores 3a. Due to such a constitution, none of the followings: the inner liner 4; the carcass ply 5; end portions 4a of the inner liner 4 and end portions 5a of the carcass ply 5 are exposed on surface of the beads 3.

By setting a distance from an end portion of the carcass ply to an upper end of the rubber chafer such that at least the rubber chafer is arranged at a position where the rubber chafer is brought into contact with the inner liner, it is possible to acquire an adhesive effect between a low modulus layer of the rubber chafer and the inner liner.

The position of the upper end of the rubber chafer is determined in accordance with a required performance and hence, the position is not particularly limited. However, in view of preventing the increase of a weight, it is preferable to set the position of the upper end of the rubber chafer at the position which is less than or equal to 55% of a length of a periphery from an end portion of a belt to an upper end portion of the carcass ply and/or at the position 10 mm away from the upper end portion of the carcass ply outwardly in the outer radial direction.

The rubber chafer 6 includes the low modulus layer 6a and the high modulus layer 6b which differ from each other in a 300% modulus value. The low modulus layer 6a of the rubber chafer 6 covers the whole portion which is in contact with the inner liner 4 on the inside in the tire width direction from the outside in the tire radial direction to the end portion 5a of the carcass ply 5 which constitutes a terminal end. The high modulus layer 6b of the rubber chafer 6 covers all portions ranging from the end portion 5a of the carcass ply 5 which constitutes a start end to the outer portion of the bead 3 in the tire width direction by way of a bead toe 6c where the rubber chafer 6 is brought into contact with a rim.

In this embodiment, a 300% modulus value of the low modulus layer 6a is set to 8 MPa, and a 300% modulus value of the high modulus layer 6b is set to 14 MPa. A 300% modulus value of the inner liner 4 is set to 3 MPa. The 300% modulus value of the low modulus layer 6a of the rubber chafer 6 is not limited to the above-mentioned modulus value. It is sufficient that the 300% modulus value of the low modulus layer 6a is higher than the 300% modulus value of the inner liner 4 and lower than the 300% modulus value of the high modulus layer 6b of the rubber chafer 6. The 300% modulus value of the low modulus layer 6a of the rubber chafer 6 is preferably set to a value which falls within a range of from 3.5 MPa to 8.0 Mpa (corresponding to hardness of 56 degrees to 65 degrees in accordance with JIS K 6253).

The pneumatic tire T of this embodiment is configured as described above. Accordingly, the low modulus layer 6a of the rubber chafer 6 exhibits the higher adhesiveness to the inner liner 4 compared with the high modulus layer 6b of the rubber chafer 6. Accordingly, the adhesiveness between the rubber chafer 6 and the inner liner 4 which is brought into contact with the rubber chafer 6 is increased and hence, the durability is enhanced. Further, all portions ranging from the bead toe 6c where the rubber chafer 6 is brought into contact with the rim to the outer portion of the bead 3 in the tire width direction are covered with the high modulus layer 6*b* of the rubber chafer 6 and hence, a rim rubbing prevention function at the bead 3 is not lowered. From the above-mentioned results, the pneumatic tire of the embodiment 5 exhibits excellent steering stability.

Embodiment 6

Figure 15:
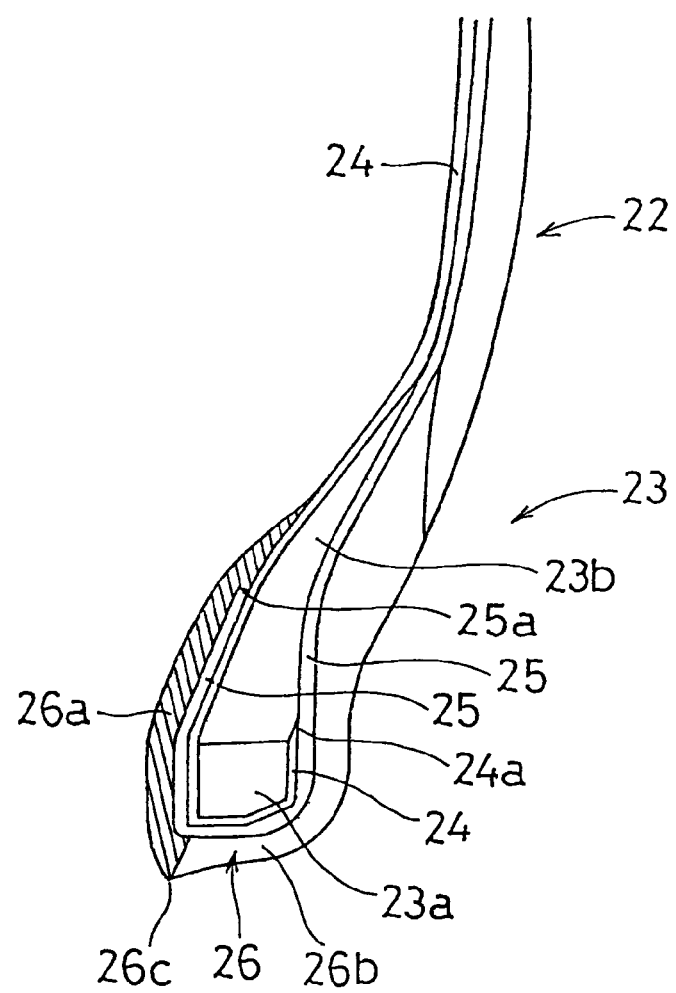
FIG. 15 is a partially enlarged view of a pneumatic tire according to an embodiment 6 of the present invention.

FIG. 15 shows the embodiment 6. In the same manner as the above-mentioned embodiment 5, a bead 23 of a pneumatic tire according to this embodiment includes a bead core 23*a* and a bead filler 23*b* made of hard rubber which extends outward in the tire radial direction from the bead core 23*a*. An inner liner 24 disposed on a tire inner surface is wound around the bead cores 23*a* from the inside in the tire width direction to the outside in the tire width direction. A carcass ply 25 is arranged so as to extend between the left and right bead cores 23*a* in a straddling manner over a tire tread, sidewalls 22 and beads 23. The carcass ply 25 is wound around the bead cores 23*a* from the outside in the tire width direction to the inside in the tire width direction. The inner liner 24 and the carcass ply 25 are arranged such that the inner liner 24 is disposed inside the carcass ply 25 around the bead cores 23*a*.

Rubber chafers 26 are arranged so as to cover the inner liner 24 and the carcass ply 25 around the bead cores 23*a*. Due to such a constitution, none of the followings: the inner liner 24; the carcass ply 25; end portions 24*a* of the inner liner 24 and end portions 25*a* of the carcass ply 25 are exposed on surfaces of the beads 23.

The rubber chafer 26 includes a low modulus layer 26*a* and a high modulus layer 26*b* which differ from each other in a 300% modulus value. The low modulus layer 26*a* of the rubber chafer 26 is disposed on a tire inner surface from the outside in the tire radial direction and at the inside of the tire width direction which terminates at a bead toe 26*c*, and covers the whole portion which is in contact with the inner liner 24. The high modulus layer 26*b* of the rubber chafer 26 covers all portions of the outer portion of the bead 23 in the tire width direction ranging from a bead toe 26*c* which constitutes a start end.

In this embodiment, a 300% modulus value of the low modulus layer 26*a* is set to 5 MPa, and a 300% modulus value of the high modulus layer 26*b* is set to 14 MPa. A 300% modulus value of the inner liner 24 is set to 3 MPa. The 300% modulus value of the low modulus layer 26*a* of the rubber chafer 26 is not limited to the above-mentioned modulus value. It is sufficient that the 300% modulus value of the low modulus layer 26*a* be higher than the 300% modulus value of the inner liner 24 and lower than the 300% modulus value of the high modulus layer 26*b* of the rubber chafer 26. The 300% modulus value of the low modulus layer 26*a* of the rubber chafer 26 is preferably set to a value which falls within a range of from 3.5 MPa to 8.0 Mpa.

The pneumatic tire of this embodiment is configured as described above. The low modulus layer 26*a* of the rubber chafer 26 exhibits higher adhesiveness to the inner liner 24 compared with the high modulus layer 26*b* of the rubber chafer 26. Accordingly, adhesiveness between the rubber chafer 26 and the inner liner 24 which is brought into contact with the rubber chafer 26 is increased and hence, the durability is enhanced. Further, all portions of the bead ranging from the bead toe 26*c* where the rubber chafer 26 is brought into contact with a rim to a portion of the bead outside in the tire width direction are covered with the high modulus layer 26*b* of the rubber chafer 26 and hence, a rim rubbing prevention function is not lowered. From the above-mentioned results, the pneumatic tire of the embodiment 6 exhibits excellent steering stability.

Embodiment 7

Figure 16:
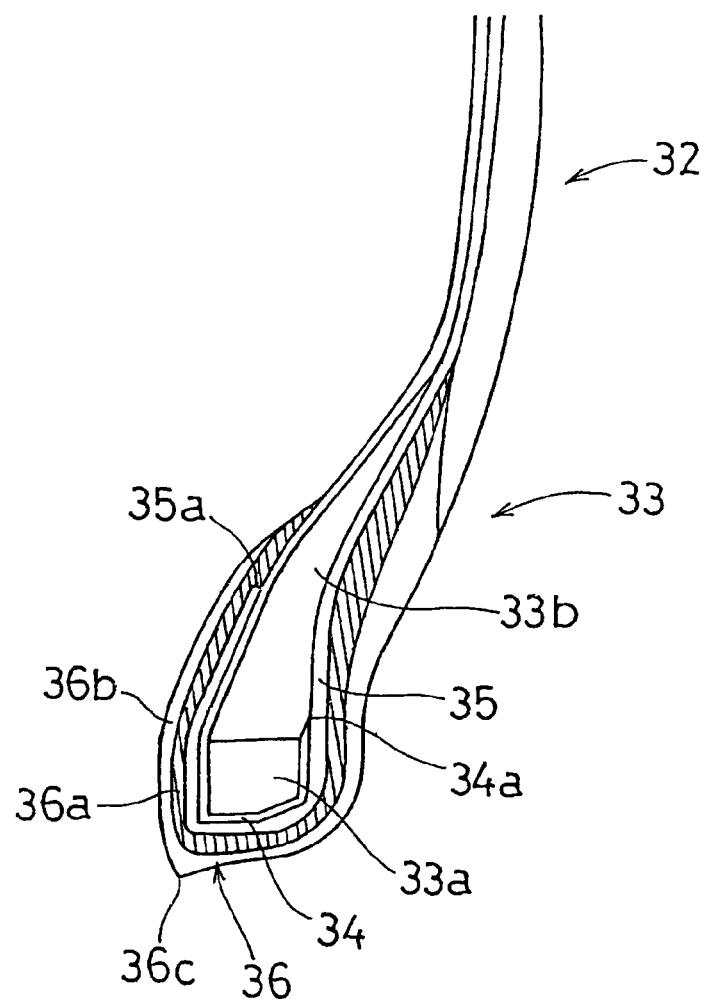
FIG. 16 is a partially enlarged view of a pneumatic tire according to an embodiment 7 of the present invention.

FIG. 16 shows an embodiment 7. In the same manner as the above-mentioned embodiment 5, a bead 33 of a pneumatic tire according to this embodiment includes a bead core 33*a* and a bead filer 33*b* made of hard rubber which extends outward in the tire radial direction from the bead core 33*a*. An inner liner 34 disposed on a tire inner surface is wound around the bead cores 33*a* from the inside in the tire width direction to the outside in the tire width direction. A carcass ply 35 is arranged so as to extend between the left and right bead cores 33*a* in a straddling manner over a tire tread, sidewalls 32 and beads 33. The carcass ply 35 is wound around the bead cores 33*a* from the outside in the tire width direction to the inside in the tire width direction. The inner liner 34 and the carcass ply 35 are arranged such that the inner liner 34 is disposed inside the carcass ply 35 around the bead cores 33*a*.

Rubber chafers 36 are arranged so as to cover the inner liner 34 and the carcass ply 35 around the bead cores 33*a*. Due to such a constitution, none of the followings: the inner liner 34, the carcass ply 35, end portions 34*a* of the inner liner 34 and end portions 35*a* of the carcass ply 35 are exposed on surfaces of the beads 33.

The rubber chafer 36 includes a low modulus layer 36*a* and a high modulus layer 36*b* which differ from each other in a 300% modulus value. The low modulus layer 36*a* of the rubber chafer 36 is disposed only on an inner side of the rubber chafer 36 in the thickness direction of the rubber chafer 36. That is, in the rubber chafer 36 which extends from the inside in the tire width direction and covers the outside in the tire width direction by way of a bead toe 36*c*, the low modulus layer 36*a* is in contact with the inner liner 34 and the carcass ply 35, and the high modulus layer 36*b* of the rubber chafer 36 is exposed on an outer surface of the rubber chafer 36.

In this embodiment, a 300% modulus value of the low modulus layer 36*a* is set to 3.5 MPa, and a 300% modulus value of the high modulus layer 36*b* is set to 14 MPa. A 300% modulus value of the inner liner 34 is set to 3 MPa. The 300% modulus value of the low modulus layer 36*a* of the rubber chafer 36 is not limited to the above-mentioned modulus value. It is sufficient that the 300% modulus value of the low modulus layer 36*a* be higher than the 300% modulus value of the inner liner 34 and lower than the 300% modulus value of the high modulus layer 36*b* of the rubber chafer 36. The 300% modulus value of the low modulus layer 36*a* of the rubber chafer 36 is preferably set to a value which falls within a range of from 3.5 MPa to 8.0 Mpa.

The pneumatic tire of this embodiment is configured as described above. The low modulus layer 36*a* of the rubber chafer 36 exhibits higher adhesiveness to the inner liner 34 compared with the high modulus layer 36*b* of the rubber chafer 36. Accordingly, adhesiveness between the rubber chafer 36 and the inner liner 34 which is brought into contact with the rubber chafer 36 is increased so that the durability is enhanced. Further, all portions ranging from the bead toe 36*c* where the rubber chafer 36 is brought into contact with the rim to the portion of the bead 36 outside in the tire width direction are covered with the high modulus layer 36*b* of the rubber chafer 36 and hence, a rim rubbing prevention function is not lowered. From the above-mentioned results, the pneumatic tire of the embodiment 7 exhibits excellent steering stability.

[Comparison Test]

Next, a comparison test is carried out with respect to the pneumatic tire according to the present invention under the following conditions. The comparison test is carried out by comparing the following conventional example 3, the above-mentioned embodiments 5 to 7, and the following comparison examples 3 to 5.

Test Item

Test tire: 195/65R15 91H

Vehicle used for test: sedan-type vehicle car made in Japan with displacement of 1.8 L To evaluate a rim rubbing prevention function, a time until the internal structure is exposed is measured using a drum durability testing machine under the conditions where an air pressure is 180 kPa, a load is 6 kN, and a speed is 80 km/h. The rim rubbing prevention functions are evaluated by indexes with the result of the conventional example 3 taken as an index of 100. The larger the index, the higher the rim rubbing prevention function becomes.

To evaluate the durability, a traveling distance that a vehicle travels until a tire failure occurs is measured in accordance with FMVSS139. The durabilities are evaluated by indexes with the result of the conventional example 3 taken as an index of 100. The larger the index, the higher the durability becomes.

To evaluate steering stability, a vehicle used for the test is subjected to actual vehicle traveling at a speed of 100 km/h on a dry road, and a driver performs a function evaluation with respect to the steering stability. The steering stabilities are evaluated by indexes with the evaluation of the conventional example 3 taken as an index of 100. The larger the index, the higher the steering stability becomes.

Constitution of Conventional Example 3

Although not shown in the drawing, in summary, the structure of a pneumatic tire of the conventional example 3 is the general tire structure. That is, the pneumatic tire of a conventional example 3 has the structure where a carcass ply is wound around bead cores from the inside to the outside in the tire width direction, and an inner liner is wound from the inside to the outside in the tire width direction in an overlapping manner on an outer side of the carcass ply. A rubber chafer does not include a low modulus layer, and includes only a high modulus layer whose 300% modulus value is 14 MPa.

Constitution of Comparison Example 3

Figure 17:
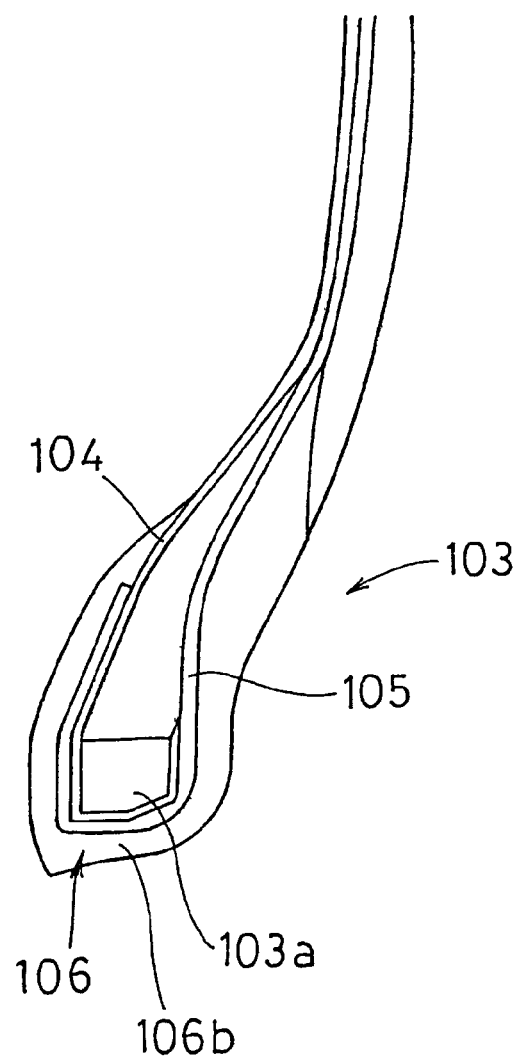
FIG. 17 is a partially enlarged view of a pneumatic tire according to a comparison example 3 of the present invention.

As shown in FIG. 17, in summary, the structure of a pneumatic tire of the comparison example 3 is as follows. At beads 103, a carcass ply 105 is wound around bead cores 103a from the outside in the tire width direction to the inside in the tire width direction, an inner liner 104 is wound around the bead cores 103a from the inside in the tire width direction to the outside in the tire width direction such that both end port ions of the inner liner 104 extend between the beads 103 and the carcass ply 105, and rubber chafers 106 are disposed around the bead cores 103a. In such a pneumatic tire of the comparison example 3, the rubber chafer 106 does not include a low modulus layer, and includes only a high modulus layer 106b whose 300% modulus value is 14 MPa. That is, the high modulus layer 106b whose 300% modulus value is 14 MPa is in contact with the inner liner 104.

Constitution of Comparison Example 4

Figure 18:
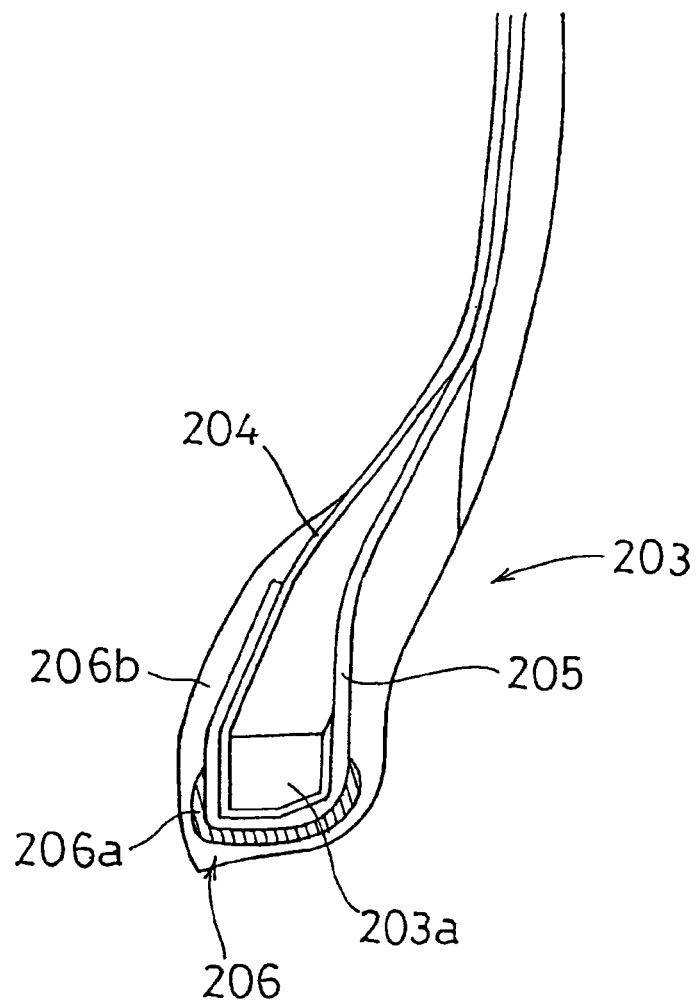
FIG. 18 is a partially enlarged view of a pneumatic tire according to a comparison example 4 of the present invention.

As shown in FIG. 18, in summary, the structure of a pneumatic tire of a comparison example 4 is as follows. At beads 203, a carcass ply 205 is wound around bead cores 203a from the outside in the tire width direction to the inside in the tire width direction, an inner liner 204 is wound around the bead cores 203a from the inside in the tire width direction to the outside in the tire width direction such that both end portions of the inner liner 204 extend between the beads 203 and the carcass ply 205, and rubber chafers 206 are disposed around the bead cores 203a. In such a pneumatic tire of the comparison example 4, the rubber chafer 206 is formed as follows. A low modulus layer 206a whose 300% modulus value is 5 MPa is disposed only in an area in the vicinity of a lower center portion of the bead such that the low modulus layer 206a is in contact with a bottom surface of the carcass ply 205. A high modulus layer 206b whose 300% modulus value is 14 MPa is disposed at portions of the carcass ply 205 other than the area in the vicinity of a lower center portion of the bead including the whole surface of the bead. That is, the high modulus layer 206b whose 300% modulus value is 14 MPa is in contact with the inner liner 204.

Constitution of Comparison Example 5

Figure 19:
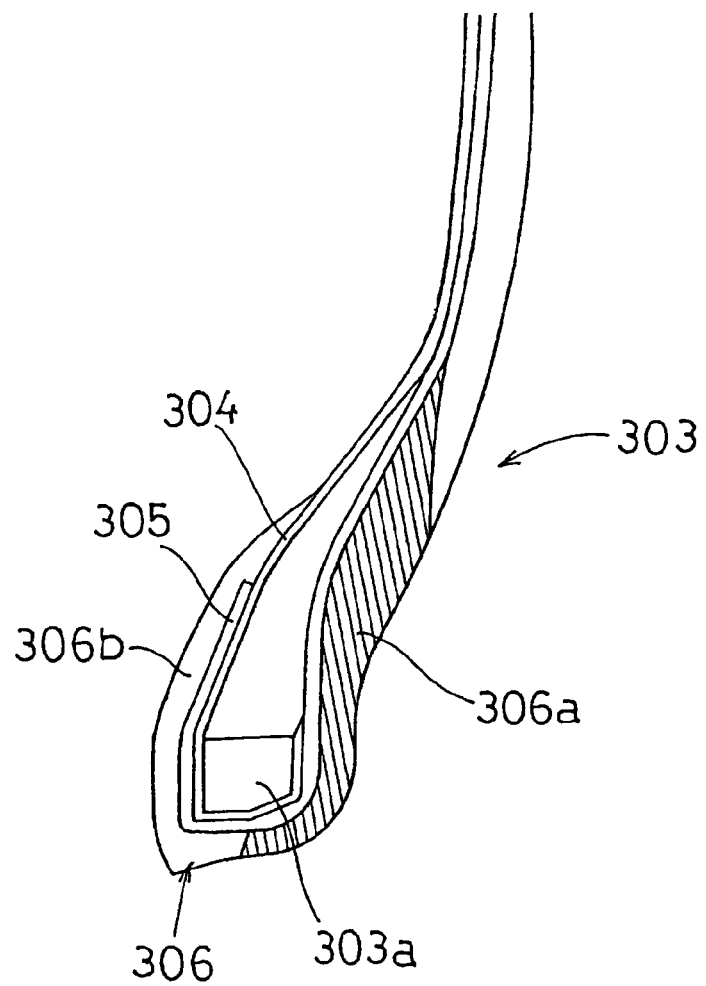
FIG. 19 is a partially enlarged view of a pneumatic tire according to a comparison example 5 of the present invention.

As shown in FIG. 19, in summary, the structure of a pneumatic tire of a comparison example 5 is as follows. At heads 303, a carcass ply 305 is wound around bead cores 303a from the outside in the tire width direction to the inside in the tire width direction, an inner liner 304 is wound around the bead cores 303a from the inside in the tire width direction to the outside in the tire width direction such that both end portions of the inner liner 304 extend between the beads 303 and the carcass ply 305, and rubber chafers 306 are disposed around the bead cores 303a. In such a pneumatic tire of the comparison example 5, the rubber chafer 306 is formed as follows. A low modulus layer 306a whose 300% modulus value is 5 MPa is disposed in a region ranging from an area in the vicinity of a lower center portion of the bead which is on a center portion of a bottom surface of the carcass ply 305a to the outside in the tire width direction, and a high modulus layer 306b whose 300% modulus value is 14 MPa is disposed in region ranging from the area in the vicinity of the lower center portion of the bead which is on the center portion of the bottom surface of the carcass ply 305 to the inside in the tire width direction. That is, the high modulus layer 306b whose 300% modulus value is 14 MPa is in contact with the inner liner 304.

TABLE 3

| Content | conventional example 3 general structure | comparison example 3 | comparison example 4 | comparison example 5 | embodiment 5 | embodiment 6 | embodiment 7 |
|---|---|---|---|---|---|---|---|
| arrangement of low modulus layer (A layer) of rubber chafer | — | — | only center | only tire outer side | portion which is in contact with inner liner layer | from the inside in tire width direction to bead toe | only inside in thickness direction |

TABLE 3-continued

| Content | conventional example 3 general structure | comparison example 3 | comparison example 4 | comparison example 5 | embodiment 5 | embodiment 6 | embodiment 7 |
|---|---|---|---|---|---|---|---|
| arrangement of high modulus layer of rubber chafer | all | all | all (a portion of the center being A layer) | only tire inner side | all other than A layer | from the outside in tire width direction to bead toe | only outside in thickness direction |
| modulus value of inner liner | 3 | 3 | 3 | 3 | 3 | 3 | 3 |
| modulus value of low modulus layer | — | — | 5 | 5 | 8 | 5 | 3.5 |
| modulus value of high modulus layer | 14 | 14 | 14 | 14 | 14 | 14 | 14 |
| rim rubbing prevention function | 100 | 100 | 100 | 68 | 100 | 100 | 100 |
| durability | 100 | 75 | 75 | 75 | 105 | 103 | 100 |
| steering stability | 100 | 107 | 105 | 103 | 107 | 105 | 105 |

[Results of Comparison Test]

In the pneumatic tires of the comparison examples 3 to 5, the high modulus layer whose 300% modulus value is 14 MPa is in contact with the inner liner and hence, compared with the pneumatic tires of the conventional examples having the general structure, the durability is lowered.

In the pneumatic tire of the comparison example 5, the low modulus layer 306a whose 300% modulus value is 5 MPa is disposed in the region ranging from the area in the vicinity of the lower center portion of the bead on the center portion of the bottom surface of the carcass ply 305 which is in contact with the rim to the outside in the tire width direction and hence, a rim rubbing prevention function is largely lowered.

With respect to the steering stability, in all of the embodiments 5 to 7 and the comparison examples 3 to 5, at beads, the carcass ply is wound around the bead cores from the outside in the tire width direction to the inside in the tire width direction, the inner liner is wound around the bead cores from the inside in the tire width direction to the outside in the tire width direction such that both end portions of the inner liner extend between the beads and the carcass ply, and the rubber chafers are disposed around the bead cores. Accordingly, all of the tires of the embodiments 5 to 7 and the comparison examples 3 to 5 exhibit favorable steering stability.

From the above-mentioned test results, it is found that the pneumatic tire according to the present invention is configured such that the inner liner is in contact with the low modulus layers of the rubber chafers thus enhancing adhesiveness. Accordingly, the pneumatic tire according to the present invention exhibits excellent durability, a favorable rim rubbing prevention function and excellent steering stability.

Although some embodiments of the present invention have been explained, these embodiments are provided as examples, and are not intended to limit the scope of the invention. These embodiments can be carried out in various modes, and various omissions, replacements or changes can be made thereto without departing from the gist of the invention. These embodiments and modifications of the embodiments are included in the scope and the gist of the invention and, in the same manner, are also included in the invention described in Claims and scopes equivalent thereto.

REFERENCE SIGNS LIST

T: pneumatic tire
1: tire tread
1': top portion of tire tread
1a: belt and belt reinforcement
1b: tread rubber
1c: shoulder region
2: sidewall
2a: maximum width position of tire
3: bead
3a: bead core
3a': lower end of bead core
3b: bead filler
4: inner liner
4a: end portion of inner liner
5: carcass ply
5a: end portion of carcass ply
6: rubber chafer
H: height in tire cross section (distance in tire radial direction from lower end of bead to top portion 1' of the tire tread 1 disposed above lower end of bead in perpendicular direction in a state where tire is assembled onto rim)
Hi: height of wound inner liner (distance in tire radial direction from lower end of bead to wound upper end of inner liner in a state where tire is assembled onto rim)
Hp: height of wound carcass ply (distance in tire radial direction from lower end of bead to wound upper end of carcass ply in a state where tire is assembled onto rim)
11: tread ring
13: bead
13a: bead core
13b: bead filler
14: inner liner
14a: both end portions of inner liner
15: carcass ply
15a: both end portions of carcass ply
17: sidewall rubber
18: rubber chafer
20: tire building drum
20a: bead set
20b: core
20c: stitcher roll
3a": lower end of bead
6': upper end of rubber chafer
7: adhesion-reinforcing rubber layer
7': upper end of adhesion-reinforcing rubber layer
HRCH: vertical height from lower end of bead to upper end of rubber chafer HA: height from lower end of bead to upper end of adhesion-reinforcing rubber layer
H: vertical height from lower end of bead to upper end of tire tread surface
A: range of adhesion-reinforcing rubber layer in inner liner
6a: low modulus layer
6b: high modulus layer
6c: bead toe
22: sidewall
23: bead
23a: bead core
23b: bead filler
24: inner liner
24a: end portion of inner liner
25: carcass ply
25a: end portion of carcass ply
26: rubber chafer
26a: low modulus layer
26b: high modulus layer
26c: bead toe
32: sidewall
33: bead
33a: bead core
33b: bead filler
34: inner liner
34a: end portion of inner liner
35: carcass ply
35a: end portion of carcass ply
36: rubber chafer
36a: low modulus layer
36b: high modulus layer
36c: bead toe
103: bead
103a: bead core
104: inner liner
105: carcass ply
106: rubber chafer
106a: low modulus layer
106b: high modulus layer
203: bead
203a: bead core
204: inner liner
205: carcass ply
206: rubber chafer
206a: low modulus layer
206b: high modulus layer
303: bead
303a: bead core
304: inner liner
305: carcass ply
306: rubber chafer
306a: low modulus layer
306b: high modulus layer

The invention claimed is:

1. A pneumatic tire comprising: a pair of left and right beads including bead cores; a carcass ply extending between the bead cores; and an inner liner disposed on an inner peripheral side of the carcass ply, wherein
the carcass ply is wound around the bead cores from the outside in the tire width direction to the inside in the tire width direction, and
both end portions of the inner liner extend between the beads and the carcass ply respectively.

2. The pneumatic tire according to claim 1, wherein a winding height of the carcass ply is 55% or less of a tire cross-section height taken upwardly in the perpendicular direction from a nominal diameter.

3. The pneumatic tire according to claim 1, wherein the inner liner is wound around the bead cores from the inside in the tire width direction to the outside in the tire width direction.

4. The pneumatic tire according to claim 2, wherein a winding height of the inner liner is 5% or less of the tire cross-section height taken upwardly in the perpendicular direction from the nominal diameter.

5. The pneumatic tire according to claim 1, wherein a rubber chafer is disposed around the bead cores.

6. The pneumatic tire according to claim 5, wherein the rubber chafers are disposed so as to cover at least wound end portions of the carcass ply.

7. The pneumatic tire according to claim 5, wherein
adhesion-reinforcing rubber layers for adhering the rubber chafers are provided to portions of the inner liner, and
a 300% modulus value of the adhesion-reinforcing rubber layer is higher than a 300% modulus value of the inner liner and is lower than a 300% modulus value of the rubber chafer.

8. The pneumatic tire according to claim 7, wherein the 300% modulus value of the adhesion-reinforcing rubber layer falls within a range of from 4.1 MPa to 6.1 MPa, and the 300% modulus value of the inner liner falls within a range of from 3.0 MPa to 4.0 MPa.

9. The pneumatic tire according to claim 7, wherein the adhesion-reinforcing rubber layer is disposed within a range of 5% to 55% of a vertical height from a lower end of the bead to an upper end of the tire tread surface as counted from the lower end.

10. The pneumatic tire according to claim 7, wherein an upper end of the adhesion-reinforcing rubber layer is covered by the rubber chafer.

11. The pneumatic tire according to claim 5, wherein
the rubber chafer has a low modulus layer and a high modulus layer which differ from each other in a 300% modulus value, and
the low modulus layer is disposed at least at a position where the rubber chafer is brought into contact with the inner liner.

12. The pneumatic tire according to claim 11, wherein a 300% modulus value of the low modulus layer falls within a range of from 3.5 MPa to 8.0 MPa, and is more than or equal to the 300% modulus value of the inner liner.

13. The pneumatic tire according to claim 11, wherein the low modulus layer of the rubber chafer disposed on an outer surface side of the rubber chafer extends to a bead toe from an upper end portion of the rubber chafer on a tire inner surface side.

14. A method of manufacturing a pneumatic tire comprising the steps of:
laminating an inner liner onto a building drum;
placing a pair of beads including bead cores and bead fillers on the inner liner at equal distances with respect to the center of a tire width;
winding both end portions of the inner liner around the beads to the outside in the tire width direction, and pressure-bonding the bead fillers to the inner liner;
laminating a carcass ply to the bead fillers pressure-bonded to the inner liner;
laminating side wall rubbers to the carcass ply;
forming a green case by pressure-bonding the carcass ply and the side wall rubbers to wound portions of the inner liner, and by folding back both end portions of the carcass ply toward an inner peripheral side of the beads; and enlarging the green case, laminating a tread ring formed of a belt and a tread rubber to the green case and, thereafter, winding both end portions of the carcass ply around the beads to the inside in the tire width direction.

15. The method of manufacturing a pneumatic tire according to claim 14, further comprising the steps of:

laminating the side wall rubbers to the carcass ply and laminating the rubber chafers to both end portions of the carcass ply;

forming a green case by pressure-bonding the carcass ply and the side wall rubbers to the wound portions of the inner liner, and by folding back both end portions of the carcass ply toward an inner peripheral side of the beads together with the rubber chafers;

enlarging the green case, laminating the tread ring formed of a belt and a tread rubber to the green case and, thereafter, winding both end portions of the carcass ply to the inside in the tire width direction of the beads together with the rubber chafers thus covering a winding portion of the carcass ply by the rubber chafers.

\* \* \* \* \*